(12) United States Patent
Tan et al.

(10) Patent No.: US 12,504,883 B2
(45) Date of Patent: Dec. 23, 2025

(54) MEMORY CONTROLLER AND MEMORY SYSTEM PERFORMING WRITE DISTURBANCE MANAGEMENT

(71) Applicant: YANGTZE MEMORY TECHNOLOGIES CO., LTD., Wuhan (CN)

(72) Inventors: Hua Tan, Wuhan (CN); Xing Wang, Wuhan (CN); Yaolong Gao, Wuhan (CN); Fanya Bi, Wuhan (CN); Zhe Sun, Wuhan (CN); Bo Yu, Wuhan (CN)

( * ) Notice: Subject to any disclaimer, the term of this patent is extended or adjusted under 35 U.S.C. 154(b) by 0 days.

(21) Appl. No.: 18/208,722

(22) Filed: Jun. 12, 2023

(65) Prior Publication Data

US 2024/0361916 A1    Oct. 31, 2024

Related U.S. Application Data

(63) Continuation of application No. PCT/CN2023/091918, filed on Apr. 29, 2023.

(51) Int. Cl.
*G06F 3/06* (2006.01)
*G06F 12/1009* (2016.01)

(52) U.S. Cl.
CPC .......... *G06F 3/0616* (2013.01); *G06F 3/0653* (2013.01); *G06F 3/0673* (2013.01); *G06F 12/1009* (2013.01)

(58) Field of Classification Search
CPC .... G06F 3/0616; G06F 3/0653; G06F 3/0673; G06F 12/1009
See application file for complete search history.

(56) References Cited

U.S. PATENT DOCUMENTS

| | | | |
|---|---|---|---|
| 2011/0078359 A1* | 3/2011 | Van Dyke | G06F 12/0607 711/E12.078 |
| 2013/0304982 A1 | 11/2013 | Jung et al. | |
| 2015/0220276 A1* | 8/2015 | Moon | G06F 3/0638 711/103 |
| 2019/0303283 A1 | 10/2019 | McGlaughlin et al. | |
| 2019/0324855 A1* | 10/2019 | Yeh | G11C 29/52 |
| 2020/0066362 A1 | 2/2020 | Zhu et al. | |
| 2020/0097397 A1* | 3/2020 | Lee | G06F 13/1668 |
| 2020/0151052 A1 | 5/2020 | Qawami | |
| 2020/0327066 A1* | 10/2020 | Li | G06F 3/061 |
| 2023/0017824 A1* | 1/2023 | Park | G06F 3/0683 |
| 2023/0072881 A1* | 3/2023 | Xie | G06F 3/0653 |
| 2023/0074538 A1 | 3/2023 | Zhou et al. | |

OTHER PUBLICATIONS

International Search Report issued in corresponding International Application No. PCT/CN2023/091918, mailed Oct. 19, 2023, 3 pages.

* cited by examiner

*Primary Examiner* — Nanci N Wong
(74) *Attorney, Agent, or Firm* — BAYES PLLC

(57) ABSTRACT

In certain aspects, a method for operating a non-volatile memory device is provided. The non-volatile memory device includes memory units. A write count of a first memory unit of the memory units is determined. In response to the write count of the first memory unit reaching one of preset values, a flipped bit count (FBC) of a second memory unit of the memory units that is physically adjacent to the first memory unit is obtained. In response to the FBC of the second memory unit exceeding a threshold, the second memory unit is refreshed.

20 Claims, 14 Drawing Sheets

| 0 | 42 | 16 | 40 | 8 | 62 | 24 | 34 | 4 | 56 | 20 | 48 | 12 | 50 | 28 | 58 | 2 | 44 | 18 | 46 | 10 | 36 | 26 | 32 | 6 | 60 | 22 | 52 | 14 | 38 | 30 | 54 |
|---|---|---|---|---|---|---|---|---|---|---|---|---|---|---|---|---|---|---|---|---|---|---|---|---|---|---|---|---|---|---|---|
| 43 | 1 | 41 | 17 | 63 | 9 | 35 | 25 | 57 | 5 | 49 | 21 | 51 | 13 | 59 | 29 | 45 | 3 | 47 | 19 | 37 | 11 | 33 | 27 | 61 | 7 | 53 | 23 | 39 | 15 | 55 | 31 |

| | |
|---|---|
| 54 | 31 |
| 30 | 55 |
| 38 | 15 |
| 14 | 39 |
| 52 | 23 |
| 22 | 53 |
| 60 | 7 |
| 6 | 61 |
| 32 | 27 |
| 26 | 33 |
| 36 | 11 |
| 10 | 37 |
| 46 | 19 |
| 18 | 47 |
| 44 | 3 |
| 2 | 45 |
| 58 | 29 |
| 28 | 59 |
| 50 | 13 |
| 12 | 51 |
| 48 | 21 |
| 20 | 49 |
| 56 | 5 |
| 4 | 57 |
| 34 | 25 |
| 24 | 35 |
| 62 | 9 |
| 8 | 63 |
| 40 | 17 |
| 16 | 41 |
| 42 | 1 |
| 0 | 43 |

FIG. 10

MEMORY CONTROLLER AND MEMORY SYSTEM PERFORMING WRITE DISTURBANCE MANAGEMENT

CROSS-REFERENCE TO RELATED APPLICATIONS

This application is a continuation of International Application No. PCT/CN2023/091918, filed on Apr. 29, 2023, entitled "MEMORY CONTROLLER AND MEMORY SYSTEM PERFORMING WRITE DISTURBANCE MANAGEMENT," which is incorporated herein by reference in its entirety.

BACKGROUND

The present disclosure relates to memory devices and operation methods thereof.

Storage class memory (SCM) is a type of non-volatile memory that bridges the gap between traditional volatile memory, such as dynamic random-access memory (DRAM), and non-volatile storage, such as NAND Flash or hard disk drives. SCM combines the advantages of both types, providing low-latency, high-speed data access similar to DRAM, along with the persistence and higher capacity typically found in non-volatile storage. SCM is increasingly being adopted in data centers and other high-performance computing environments, where they help reduce latency, improve overall system efficiency, and provide more effective data management solutions.

SUMMARY

In one aspect, a method for operating a non-volatile memory device is provided. The non-volatile memory device includes memory units. A write count of a first memory unit of the memory units is determined. In response to the write count of the first memory unit reaching one of preset values, a flipped bit count (FBC) of a second memory unit of the memory units that is physically adjacent to the first memory unit is obtained. In response to the FBC of the second memory unit exceeding a threshold, the second memory unit is refreshed.

In some implementations, each of the memory units includes memory cells coupled to a respective one of bit lines.

In some implementations, the memory cells include phase-change memory (PCM) cells.

In some implementations, to determine the write count of the first memory unit, a number of write operations applied to a first codeword is tracked. In some implementations, the first codeword includes a first page corresponding to the first memory unit.

In some implementations, a mapping table between a physical address and a logical address for each of the memory units is stored. In some implementations, to determine the write count of the first memory unit, the logical address of the first memory unit is determined based on the first page, and the physical address of the first memory unit is determined based on the logical address of the first memory unit and the mapping table.

In some implementations, to obtain the FBC of the second memory unit, the second memory unit that is physically adjacent to the first memory unit is determined based on the physical address of the first memory unit and the physical address of the second memory unit.

In some implementations, to obtain the FBC of the second memory unit, a second page corresponding to the second memory unit is read, and a number of flipped bits in the second page is determined based on the reading and a second codeword comprising the second page.

In some implementations, to obtain the FBC of the second memory unit, the logical address of the second memory unit is determined based on the physical address of the second memory unit and the mapping table, and the second page is determined based on the logical address of the second memory unit.

In some implementations, to refresh the second memory unit, the second memory unit is rewritten with data stored in the second memory unit.

In some implementations, the first memory unit and the second memory unit are coupled to a same word line.

In another aspect, a memory system includes a non-volatile memory device and a memory controller coupled to the non-volatile memory device. The non-volatile memory device includes memory units. The memory controller is configured to determine a write count of a first memory unit of the memory units. The memory controller is also configured to, in response to the write count of the first memory unit reaching one of preset values, obtain an FBC of a second memory unit of the memory units that is physically adjacent to the first memory unit. The memory controller is further configured to, in response to the FBC of the second memory unit exceeding a threshold, refresh the second memory unit.

In some implementations, the non-volatile memory device further includes bit lines. In some implementations, each of the memory units includes memory cells coupled to a respective one of the bit lines.

In some implementations, the memory cells include PCM cells.

In some implementations, to determine the write count of the first memory unit, the memory controller is configured to track a number of write operations applied to a first codeword. In some implementations, the first codeword includes a first page corresponding to the first memory unit.

In some implementations, the memory system further includes a volatile memory device configured to store a mapping table between a physical address and a logical address for each of the memory units. In some implementations, to determine the write count of the first memory unit, the memory controller is further configured to determine the logical address of the first memory unit based on the first page, and determine the physical address of the first memory unit based on the logical address of the first memory unit and the mapping table.

In some implementations, to obtain the FBC of the second memory unit, the memory controller is configured to determine the second memory unit that is physically adjacent to the first memory unit based on the physical address of the first memory unit and the physical address of the second memory unit.

In some implementations, to obtain the FBC of the second memory unit, the memory controller is further configured to read a second page corresponding to the second memory unit, and determine a number of flipped bits in the second page based on the reading and a second codeword comprising the second page.

In some implementations, to obtain the FBC of the second memory unit, the memory controller is further configured to determine the logical address of the second memory unit based on the physical address of the second memory unit and the mapping table, and determine the second page based on the logical address of the second memory unit.

In some implementations, to refresh the second memory unit, the memory controller is configured to rewrite the second memory unit with data stored in the second memory unit.

In some implementations, the non-volatile memory device further includes word lines. In some implementations, the first memory unit and the second memory unit are coupled to a same one of the word lines.

In still another aspect, a non-transitory computer-readable storage medium is provided. The non-transitory computer-readable storage medium includes instructions that, when executed by a memory controller, cause the memory controller to determine a write count of a first memory unit of memory units in a non-volatile memory device, in response to the write count of the first memory unit reaching one of preset values, obtain an FBC of a second memory unit of the memory units that is physically adjacent to the first memory unit, and in response to the FBC of the second memory unit exceeding a threshold, refresh the second memory unit.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 10 illustrates a mapping table between logical addresses and physical addresses of memory units, according to some aspects of the present disclosure.

Figure 1:
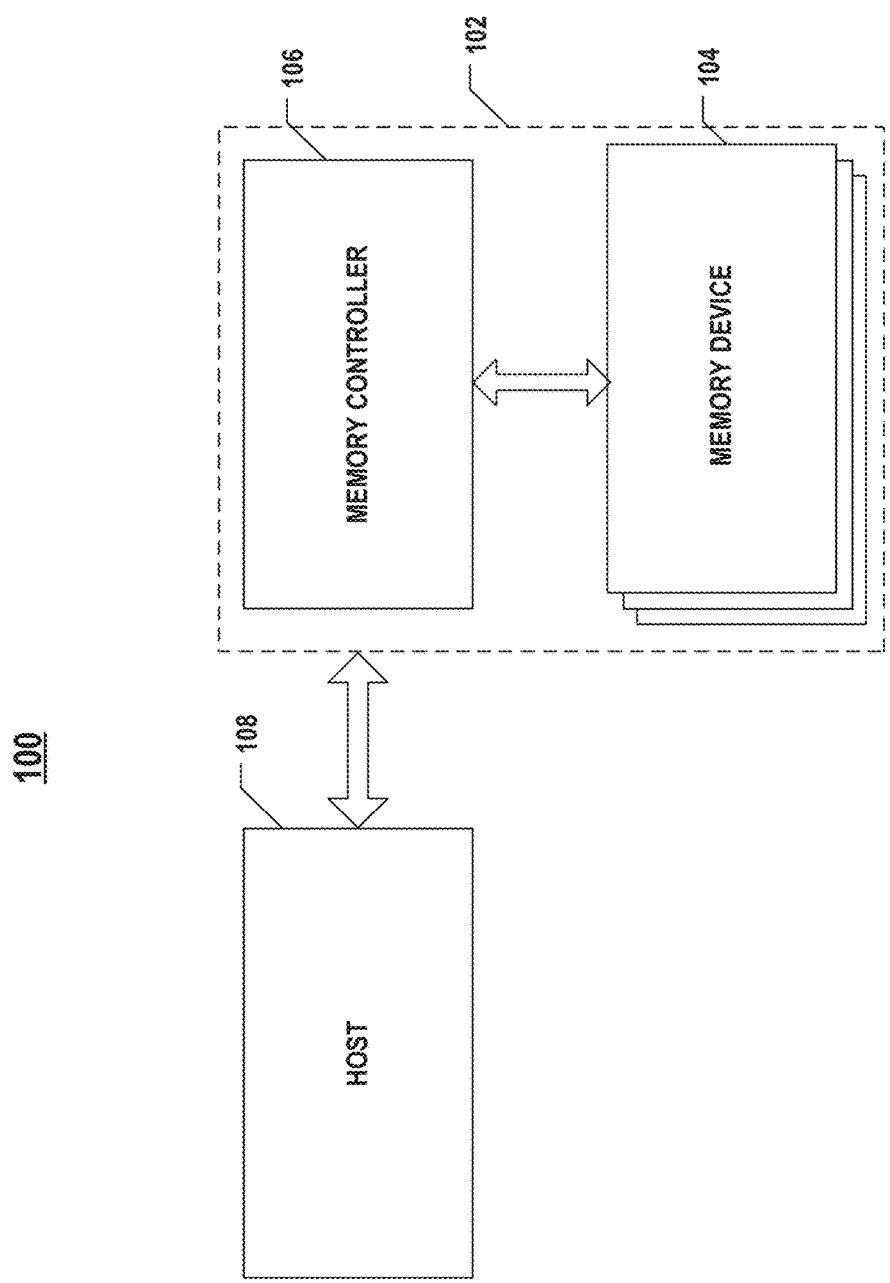
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Phase-change memory (PCM) is a promising non-volatile memory technology that can be used as storage class memory (SCM). PCM uses a chalcogenide material (e.g., a compound containing germanium (Ge), antimony (Sb), and tellurium (Te)) that can reversibly switch between crystalline and amorphous phases. These phases exhibit different levels of electrical resistance, which represent binary data. The phase transition is induced by applying heat to the memory cell, which raises the temperature of the chalcogenide material above specific thresholds.

The chalcogenide material in PCM can transit into the crystalline phase by a set process in which the chalcogenide material is heated to a temperature above its crystallization temperature but below its melting temperature. In other words, the set process changes the material's phase from amorphous to crystalline, which results in a lower resistance state. In contrast, the chalcogenide material in PCM can transit into the amorphous phase by a reset process in which the chalcogenide material is heated rapidly to a temperature above its melting temperature, causing the material to melt. The temperature is then quickly reduced, leading to the rapid cooling of the material and causing it to transition into an amorphous state, which corresponds to a higher resistance state. The reset process generally requires more energy and time compared to the set process, thereby producing more heat than the set process.

The heat produced during the write operation, in particular, in the reset process that writes bit "0" to a PCM cell, however, may have a thermal effect on the adjacent PCM cells (a.k.a. thermal crosstalk), thereby causing the so-called write disturbance to the neighboring PCM cells, for example, by transiting the phase of chalcogenide material of the neighboring PCM cells from amorphous to crystalline (flipping the bit from "0" to "1"). In other words, the heat generated during the write operation can spread to nearby PCM cells, causing undesired phase transitions in those cells, and can lead to unintentional data modifications in adjacent PCM cells. Based on the experiments, continuous write operations with reset processes can cause data corruption due to write disturbance and may even damage adjacent PCM cells (becoming uncorrectable) eventually.

To address one or more of the aforementioned issues, the present disclosure introduces a scheme for managing write disturbance of SCM products, such as PCM devices, using periodic scanning based on write count per memory unit (e.g., corresponding to a codeword). Write disturbance scanning can be performed periodically to adjacent memory units (e.g., cells coupled to adjacent bit lines) according to a scanning interval based on the increase of write count for each memory unit. When the write disturbance scanning reveals that the adjacent memory units are at risk of data corruption or even damaging, the memory units at risk can be refreshed to mitigate the risk, thereby improving the lifetime of the memory device. In some implementations, when the flipped bit count (FBC, a.k.a. failed bit count) of an adjacent memory unit exceeds a preset threshold, the adjacent memory unit is rewritten with the same data stored therein to remove the accumulated write disturbance effect. In some implementations, various conversions between logical and physical addresses of memory units, as well as operation units, are performed to enable the direct management of write disturbance by memory controllers.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SCM system.

Memory devices 104 can be any memory devices disclosed in the present disclosure, including non-volatile memory devices, such as SCM devices. For example, the non-volatile memory devices may include PCM devices. In some implementations, memory device 104 also includes one or more volatile memory devices, such as dynamic random-access memory (DRAM) devices or static random-access memory (SRAM) devices.

Memory controller 106 is coupled to memory devices 104 and host 108 and is configured to control memory devices 104, according to some implementations. Memory controller 106 can manage the data stored in memory devices 104 and communicate with host 108. In some implementations, memory controller 106 is designed for operating in a high duty-cycle environment with solid-state disks (SSDs) or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Consistent with the scope of the present disclosure and disclosed below in detail, memory controller 106 can be configured to determine write counts of each memory unit in the non-volatile memory device of memory devices 104, and in response to the write count of a memory unit reaching to one of preset values, obtain the FBC of a neighboring memory unit. Memory controller 106 can be further configured to, in response to the FBC of the neighboring memory unit exceeding the threshold, refresh the neighboring memory unit to mitigate the write disturbance to the neighboring memory unit.

Figure 2:
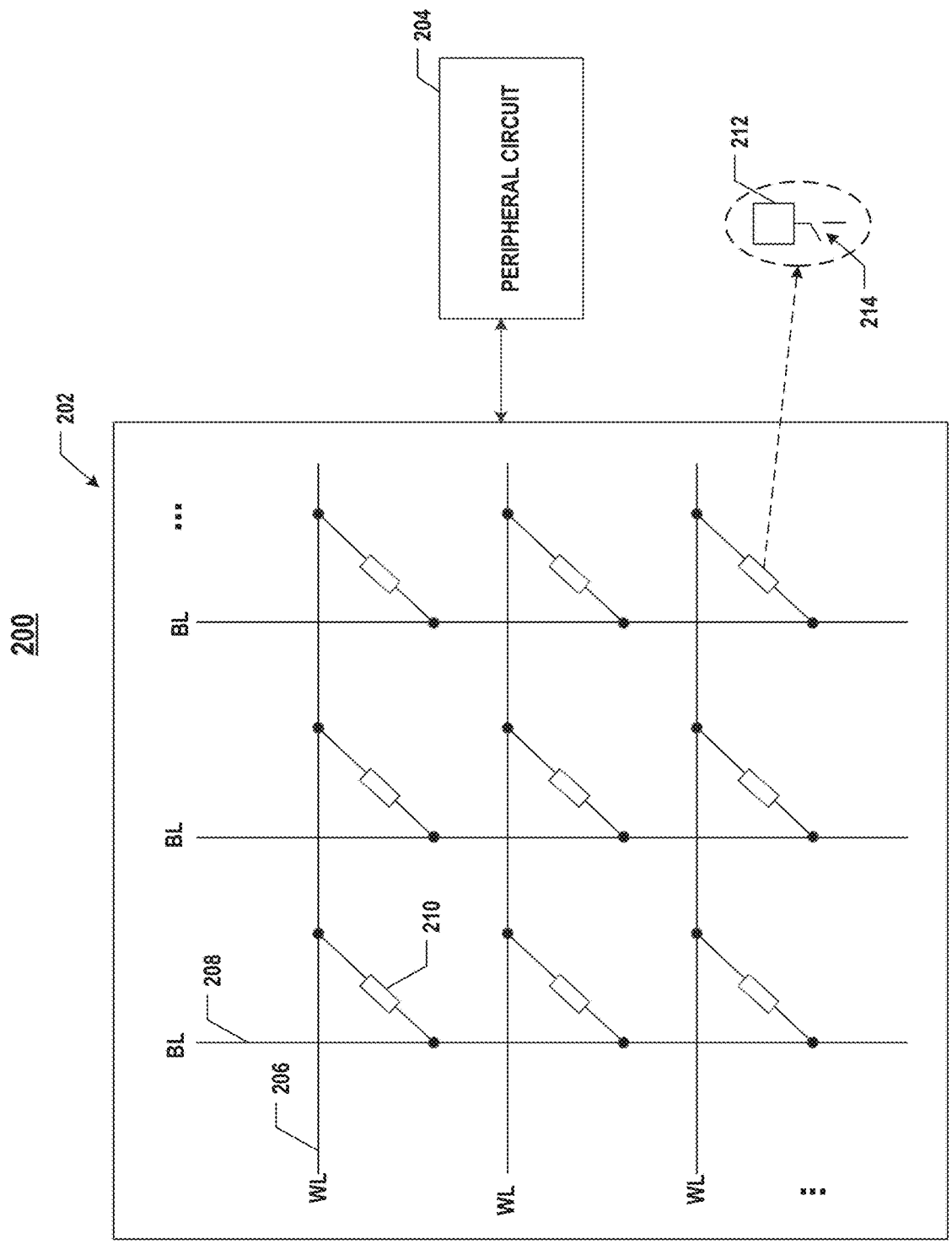
FIG. 2 illustrates a schematic diagram of an SCM device, according to some aspects of the present disclosure.

FIG. 2 illustrates a schematic diagram of an SCM device 200, according to some aspects of the present disclosure. SCM device 200 may be one example of memory device 104 in FIG. 1. SCM device 200 can include an SCM cell array 202 and peripheral circuits 204 coupled to SCM cell array 202. SCM cell array 202 can include word lines (WLs) 206, bit lines (BLs) 208, and SCM cells 210 at intersections between word lines 206 and bit lines 208. In some implementations, each SCM cell 210 includes an SCM element 212 in series with an access device 214 (a.k.a. selector). SCM element 212 can be configured to store binary data (e.g., 0 and 1) persistently, for example, by holding a continuous, analog value, such as an electrical voltage or charge, even when the power supply is interrupted or turned off. SCM element 212 includes, but not limited to, PCM elements, resistive memory elements, magnetoresistive memory elements, ferroelectric memory elements, spin-transfer torque (STT) memory elements, etc., according to some implementations. Access device 214 can be configured to control access of the corresponding SCM element 212 by peripheral circuits 204. Access device 214 includes, but not limited to, transistors, diodes, ovonic threshold switches (OTSs), mixed ionic-electronic conductors (MIECs), conductive oxide tunnel barriers, etc., according to some implementations.

As shown in FIG. 2, SCM cell array 202 can include an array of SCM cells 210 in rows and columns. The rows of SCM cells 210 can be respectively coupled to word lines 206, and the columns of SCM cells 210 can be respectively coupled to bit lines 208. Peripheral circuits 204 can be coupled to SCM cell array 202 through bit lines 208 and word lines 206.

Peripheral circuits 204 can include any suitable analog, digital, and mixed-signal circuits for facilitating the operations of SCM cell array 202 by applying and sensing voltage signals and/or current signals to and from SCM cells 210 through bit lines 208 and word lines 206. Peripheral circuits 204 can include various types of peripheral circuits formed using metal-oxide-semiconductor (MOS) technologies.

It is understood that depending on the underlying memory technologies that form SCM elements 212, SCM device 200 may include any suitable types of SCM devices, such as PCM devices, resistive RAM (ReRAM) devices, magnetoresistive RAM (MRAM) devices, ferroelectric RAM (Fe-RAM) devices, STT-RAM devices, etc. It is also understood that SCM device 200 is an example of non-volatile memory devices and may be expanded to any other suitable non-volatile memory devices that include a non-volatile memory (NVM) cell array having NVM elements and access devices.

Figure 3:
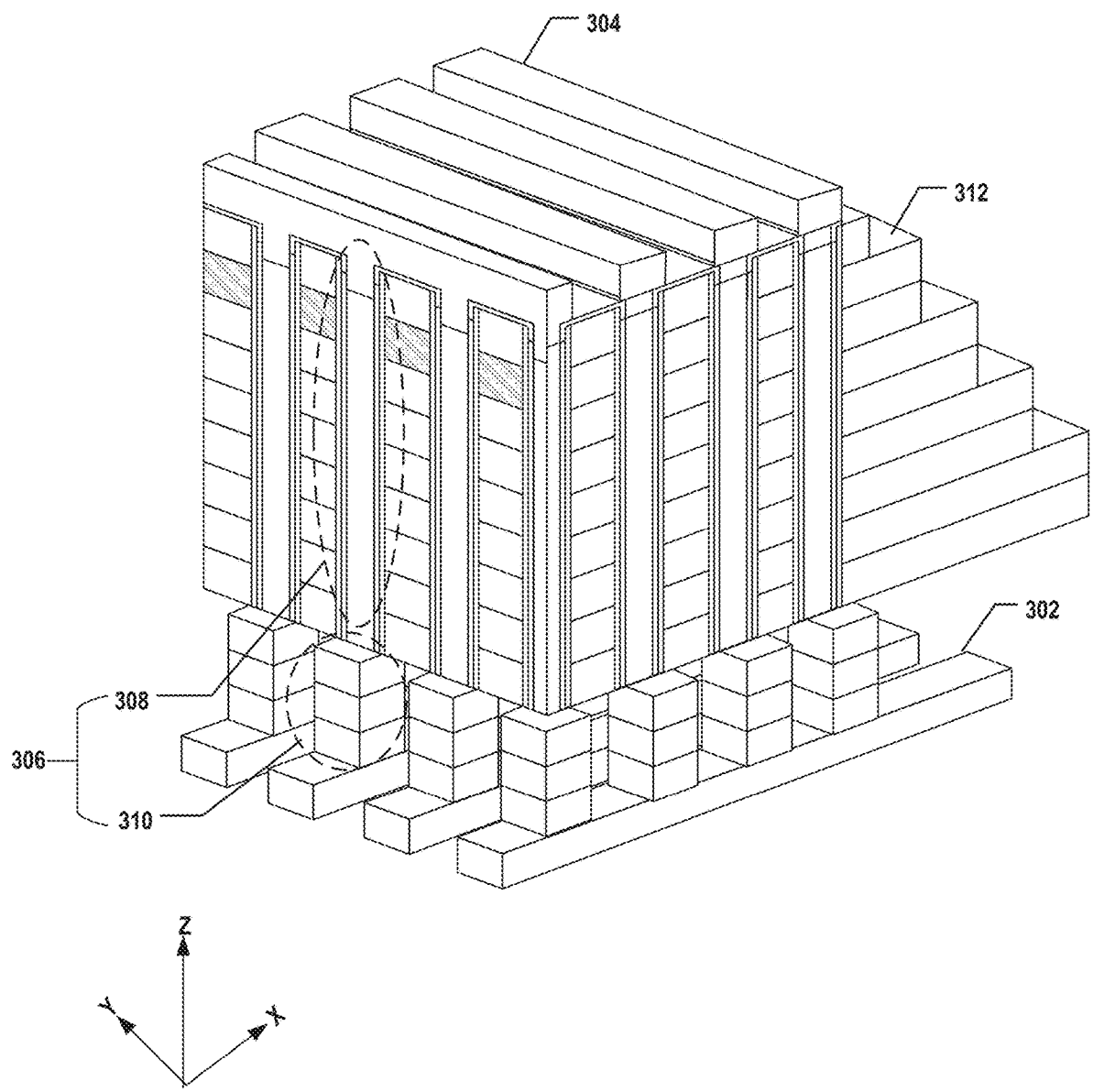
FIG. 3 illustrates a perspective view of a phase-change memory (PCM) cell array, according to some aspects of the present disclosure.

FIG. 3 illustrates a perspective view of a PCM cell array 300, according to some aspects of the present disclosure. PCM cell array 300 may be one example of SCM cell array 202 in FIG. 2. PCM cell array 300 can be formed in a three-dimensional (3D) vertical chain-cell-type architecture in which access devices 310 and PCM elements 308 forming PCM cells 306 are connected in serial and positioned at the cross points of word lines 302 and bit lines 304, as shown in FIG. 3. It is noted that x and y axes are included in FIG. 3 to illustrate two orthogonal directions in the wafer plane. The x-direction is the word line direction, and the y-direction is the bit line direction. It is noted that z-axis is also included in FIG. 3 to further illustrate the spatial relationship of the components in PCM cell array 300. The substrate (not shown) of PCM cell array 300 includes two lateral surfaces extending laterally in the x-y plane: a top surface on the front side of the wafer, and a bottom surface on the backside opposite to the front side of the wafer. The z-axis is perpendicular to both the x and y axes. As used herein, whether one component (e.g., a layer or a device) is "on," "above," or "below" another component (e.g., a layer or a device) of a semiconductor device (e.g., PCM cell array 300) is determined relative to the substrate of the semiconductor device in the z-direction (the vertical direction perpendicular to the x-y plane) when the substrate is positioned in the lowest plane of the semiconductor device in the z-direction. The same notion for describing the spatial relationships is applied throughout the present disclosure.

In some implementations, PCM cell array 300 includes parallel word lines 302 and parallel bit lines 304 in the different planes in the vertical direction. Each bit line 304 extends laterally along the bit line direction in the plan view (parallel to the wafer plane), and each word line 302 extends laterally in the word line direction in the plan view, according to some implementations. Each word line 302 thus can be perpendicular to each bit line 304.

As shown in FIG. 3, PCM cell array 300 includes a plurality of PCM cells 306 each disposed at an intersection of bit line 304 and respective word line 302, according to some implementations. Each PCM cell 306 can have a vertical pillar shape. In some implementations, each PCM cell 306 includes a PCM element 308 and an access device 310 stacked vertically. Each PCM cell 306 can store data that can be written or read by varying the voltage applied to respective access device 310. Each PCM cell 306 can be accessed individually by a current applied through the top and bottom conductors in contact with each PCM cell 306, e.g., respective word line 302 and bit line 304.

In some implementations, PCM element 308 is a chain-cell-type PCM element that includes polysilicon transistors and phase-phase layers connected in parallel. The polysilicon transistors and phase-phase layers can be formed by gate oxide, channel polysilicon, and phase-change material formed on the side of the holes of stacked gates 312. In some implementations, access device 310 is a polysilicon diode. In the write operation, an off-voltage can be applied to the selected gate 312, and a positive on-voltage can be applied to the unselected gates 312. When a set/reset pulse voltage is applied to the drain, the current can flow through the phase-change layer at the selected gates 312, and the temperature can be increased by Joule heating, causing the set/reset states. In the same way, by applying a voltage suitable for the read operation to the drain, the resistance of the phase-change layer at the selected gate 312 can be determined.

It is understood that PCM cell array 300 may be formed in any other suitable two-dimensional (2D) or 3D architectures, such as the lateral chain-cell-type architecture or 3D cross-point (XPoint) architecture. It is also understood that PCM element 308 may include any other suitable PCM elements, such as a phase-phase layer vertically stacked between two carbon electrodes. It is further understood that access device 310 may include any other suitable access devices, such as the OTS selector.

Figure 4:
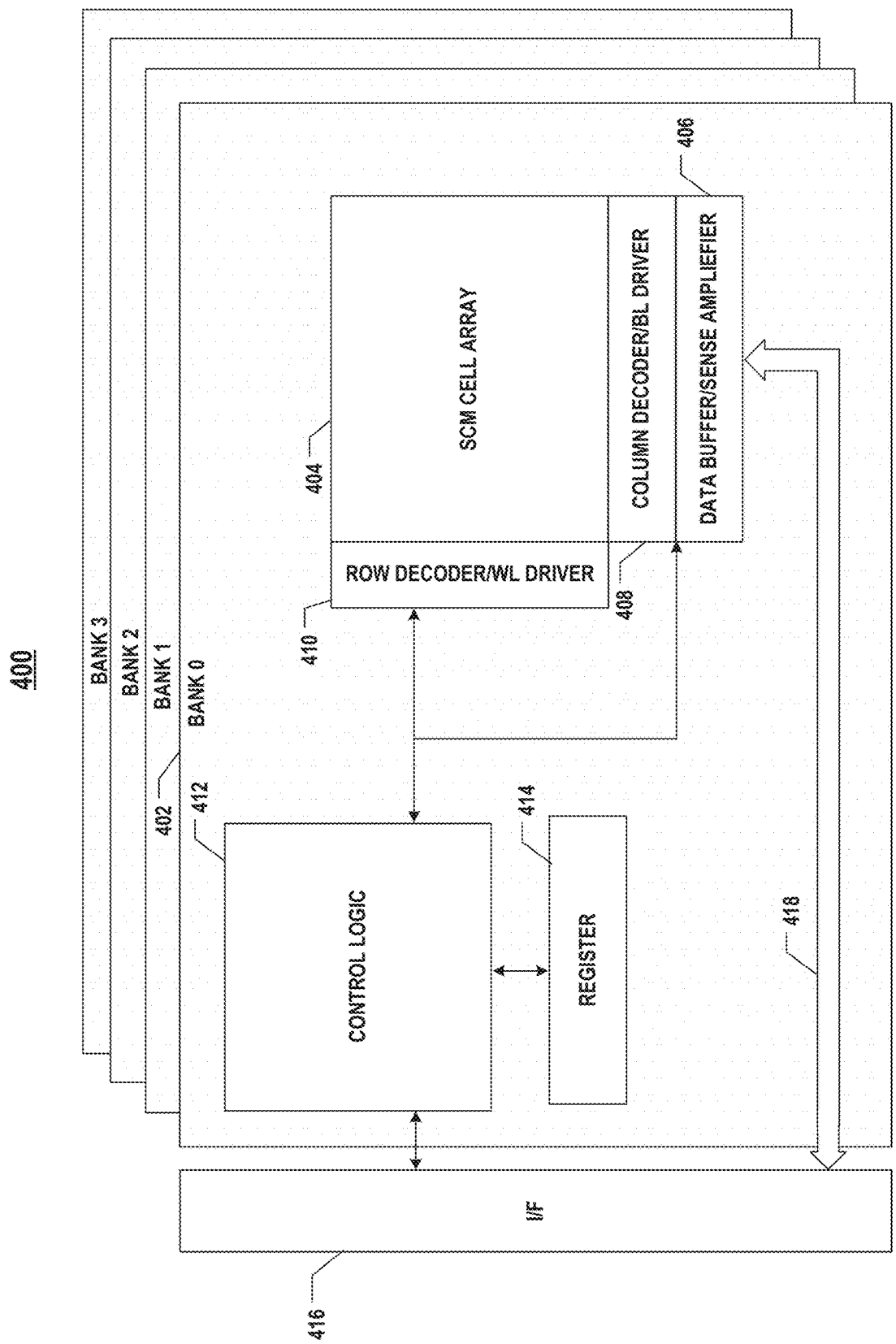
FIG. 4 illustrates a detailed diagram of an SCM device, according to some aspects of the present disclosure.

An SCM device can be divided into multiple physical modules each including an SCM cell array and peripheral circuits for the corresponding SCM cell array to enable parallel processing of the SCM device. The physical modules can be dies and/or banks. For example, FIG. 4 illustrates a detailed diagram of an SCM device 400, according to some aspects of the present disclosure. SCM device 400 may be one example of SCM device 200 in FIG. 2. As shown in FIG. 4, SCM device 400 can be divided into multiple banks 402 (e.g., 0, 1, 2, and 3) each including an SCM cell array 404. Although not shown, it is understood that in some examples, multiple banks 402 may be on the same die, and SCM device 400 may include multiple dies each including multiple banks 402.

In some implementations, each bank 402 also includes peripheral circuits for respective SCM cell array 404, including a data buffer/sense amplifier 406, a column decoder/bit line driver 408, a row decoder/word line driver 410, control logic 412, registers 414, an interface (I/F) 416, and a data bus 418. It is understood that in some examples, additional peripheral circuits not shown in FIG. 4 may be included as well, such as voltage generators, charge pumps, and any suitable types of buses.

Data buffer/sense amplifier 406 can be configured to sense (read) and program (write) data from and to SCM cell array 404 according to the control signals from control logic 412. For example, sense amplifiers may detect small voltage or current changes in SCM cell array 404 during read operations, while data buffers may temporarily store data being read from or written to SCM cell array 404.

Column decoder/bit line driver 408 can be configured to be controlled by the address signals from control logic 412 and select/deselect one or more columns of SCM cells in SCM cell array 404 by applying bit line voltages to the corresponding bit lines. Column decoder/bit line driver 408 can be further configured to drive the selected bit line(s). Row decoder/word line driver 410 can be configured to be controlled by the address signals from control logic 412 and select/deselect one or more rows of SCM cells in SCM cell array 404 by applying word line voltages to the corresponding word lines. Row decoder/word line driver 410 can be further configured to drive the selected word line(s).

Control logic 412 can be coupled to each peripheral circuit described above and configured to control the operations of each peripheral circuit. Control logic 412 can include a fixed logic unit such as a logic gate, a multiplexer, a flip-flop, a state machine, or a discrete hardware circuit performing a given logic function that is known at the time of device manufacture. In some implementations, control logic 412 is implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described herein. It is understood that although FIG. 4 shows that each bank 402 includes separate control logic 412, in some examples, multiple banks 402 may share the same control logic 412.

Registers 414 can be coupled to control logic 412 and include status registers, command registers, and address registers for storing status information, command operation codes (OP codes), and command addresses for controlling the operations of each peripheral circuit. Interface 416 can be coupled to control logic 412 and act as a control buffer to buffer and relay control commands received from a memory controller (not shown, e.g., memory controller 106 in FIG. 1) and/or host (not shown, e.g., host 108 in FIG. 1) to control logic 412 and status information received from control logic 412 to the memory controller and/or the host. Interface 416 can also be coupled to data buffer/sense amplifier 406 via data bus 418 and act as a data input/output (I/O) interface and a data buffer to buffer and relay the data to and from SCM cell array 404.

Figure 5:
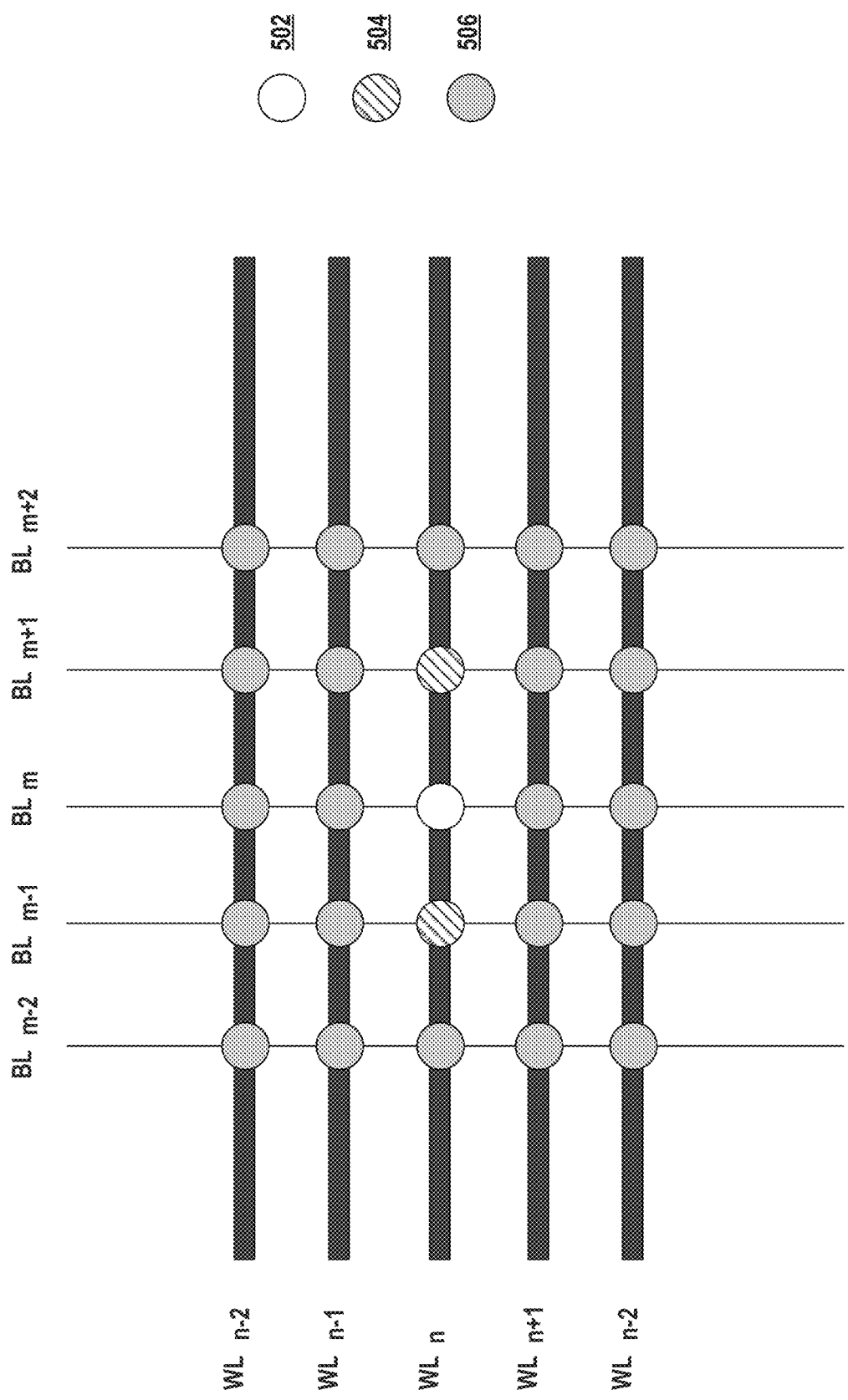
FIG. 5 illustrates write disturbance of PCM cells due to the reset process in write operations, according to some aspects of the present disclosure.

FIG. 5 illustrates write disturbance of PCM cells due to the reset process in write operations, according to some aspects of the present disclosure. As shown in FIG. 5, PCM units, each of which includes one or more PCM cells, may be formed at the intersections between word lines WLs and bit lines BLs. As described above in detail, when the reset process in write operation is repeatedly applied to a PCM unit at the intersection between WLn and BLm, which is referred to herein as an "aggressor" 502, to write bit "0" aggressor 502, the heat introduced by the reset processes may have thermal crosstalk effect on other PCM units, in particular, the PCM units that are coupled to the bit lines BLm+1, BLm−1 that are physically adjacent to aggressor 502 (neighboring PCM units) and that are on the same word line WLn as aggressor 502. Those PCM units (e.g., at the reset state "0") with the most significant write disturbance due to thermal crosstalk from aggressor 502 are referred to herein as "victims" 504. The write disturbance to other PCM units 506, as shown in FIG. 5, may be ignorable due to the heat dissipation as their distances from aggressor 502 increase and/or the relatively smaller dimensions of bit lines compared with word lines. In some implementations, victims 504 include only PCM cells at the reset state "0" and that are physically adjacent to aggressor 502 on the same word line WLn.

Figure 6:
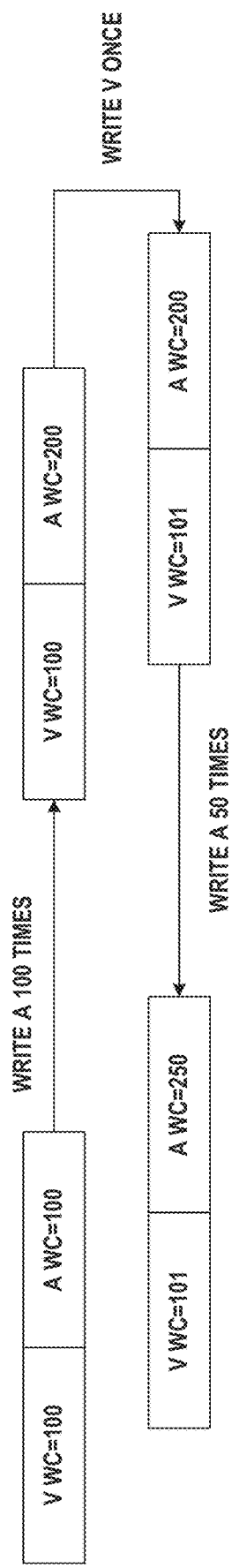
FIG. 6 illustrates an example of write disturbance and refreshing of PCM cells, according to some aspects of the present disclosure.

On the other hand, the write disturbance accumulated on victim 504 may be removed before causing data corruption or damaging victim 504 by resetting victim 504, for example, by rewriting victim 504 with the same data stored on victim 504 again. That is, the accumulated effect of thermal crosstalk due to the repeated reset process in write operations on aggressor 502 may be cleared by reading the data stored on victim 504 and writing the data back to victim 504 again. For example, FIG. 6 illustrates an example of write disturbance and refreshing of PCM cells, according to some aspects of the present disclosure. As shown in FIG. 6, assuming the numbers of write operations (write count, WC) on aggressor 502 (A) and victim 504 (V) may be 100 (A WC=100, V WC=100) at the beginning. Then, aggressor 502 may be written 100 times again, increasing its write count to 200, while victim 504 may not be written at all during this period, keeping the same write count of 100 (A WC=200, V WC=100). That is, victim 504 may have been disturbed 100 times by writing aggressor 502. If victim 504 is then written once (V WC=101), then the accumulated write disturbance effect on victim 504 may be reset to zero. Then, aggressor 502 may be written 50 times again, increasing its write count to 250, while victim 504 may not be written at all during this period, keeping the same write count 101 (A WC=250, V WC=101). That is, victim 504 may have been disturbed 50 times again by writing aggressor 502 after resetting. In some implementations, the write count only increases for the reset process, but not the set process, in write operations.

As shown in FIGS. 5 and 6, the write disturbance from aggressor 502 to victims 504 can be managed by refreshing victims 504 before the write count of aggressor 502 reaches a degree that will cause data corruption or even damage to victims 504. In practice, it is not feasible to record the write disturbance effect on each PCM unit, for example, the increment of write count of aggressor 502 since the last time each victim 504 was written. Moreover, the thermal crosstalk occurs between PCM units that are physically adjacent, while the memory controller managing the write disturbance only knows about logical indices of operation units (e.g., page numbers, codeword numbers, etc.) that may not reflect the physical locations directly.

Consistent with the scope of the present disclosure, write disturbance managing schemes are disclosed herein, which can be implemented by memory controllers disclosed herein without the need to record the write disturbance effect on each memory unit. Write disturbance scanning can be performed periodically to neighboring memory units according to a scanning interval based on the increase of write count for each memory unit. When the write disturbance scanning reveals that the adjacent memory units are at risk of data corruption or even damaging, the memory units at risk can be refreshed to mitigate the risk, thereby improving the lifetime of the memory device. In some implementations, when the FBC of an adjacent memory unit exceeds a preset threshold, the adjacent memory unit is rewritten with the same data stored therein to remove the accumulated write disturbance effect. In some implementations, various conversions between logical and physical addresses of memory units, as well as operation units, are performed to enable the direct management of write disturbance by memory controllers.

Figure 7:
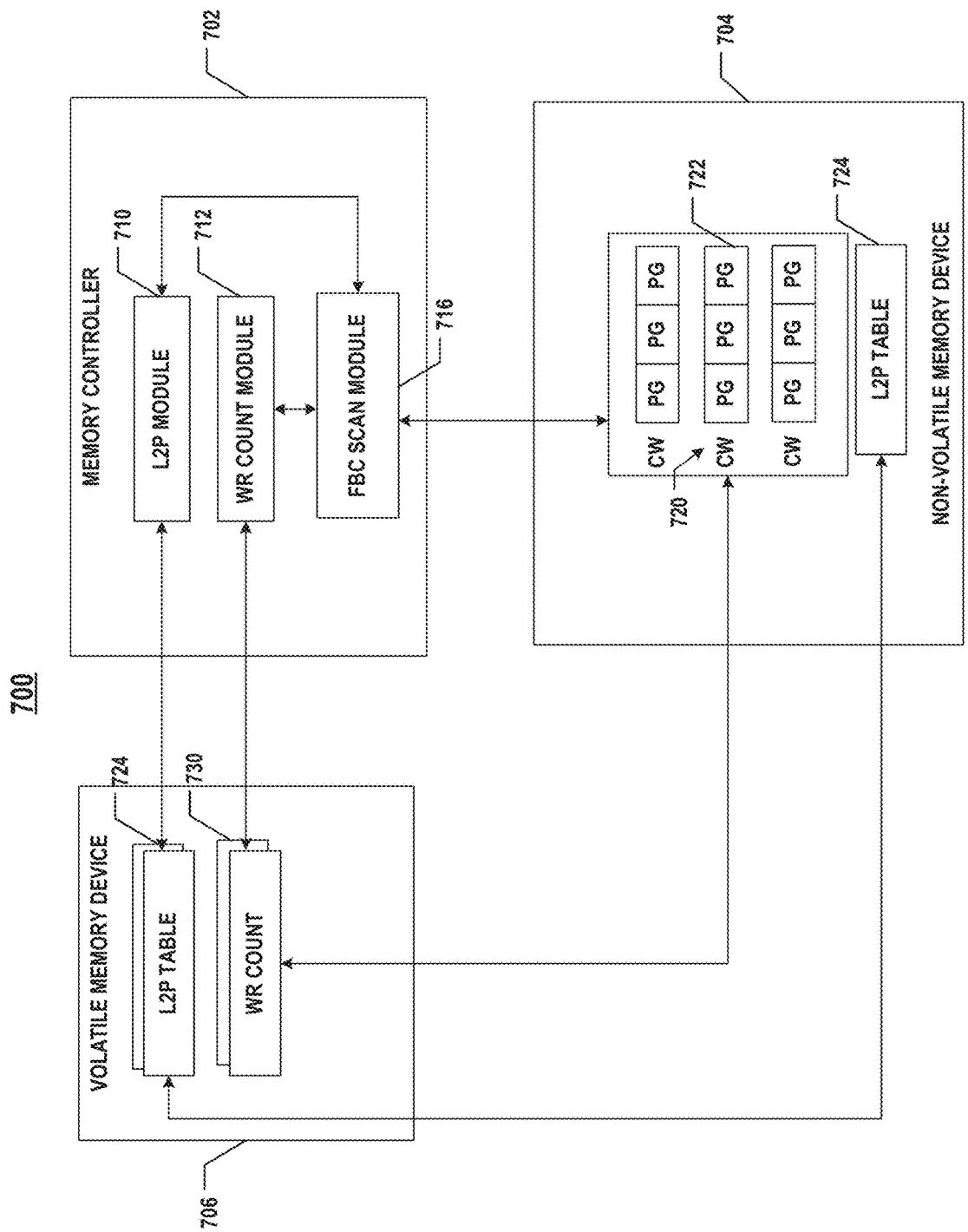
FIG. 7 illustrates a detailed diagram of a memory system including a memory controller performing periodic scanning to manage write disturbance, according to some aspects of the present disclosure.

FIG. 7 illustrates a detailed diagram of a memory system 700 including a memory controller 702 performing periodic scanning to manage write disturbance, according to some aspects of the present disclosure. Memory system 700 may be one example of memory system 102 in FIG. 1, and memory controller 702 may be one example of memory controller 106 in FIG. 1. Memory system 700 can also include one or more non-volatile memory devices 704 and one or more volatile memory devices 706. Non-volatile memory device(s) 704 and volatile memory device(s) 706 may be examples of memory devices 104 in FIG. 1. In some implementations, non-volatile memory device 704 includes an SCM device, such as SCM devices 200 and 400, or any SCM devices disclosed herein. In one example, the SCM devices may include PCM devices. In some implementations, volatile memory device 706 includes a DRAM or SRAM. It is understood that although volatile memory device 706 in FIG. 7 is shown as a standalone device separate from memory controller 702, in some examples, a part or the entirety of volatile memory device 706 may be part of memory controller 702.

As shown in FIG. 7, memory controller 702 can include an L2P module 710, a write count module 712, and an FBC scan module 716. Each of L2P module 710, write count module 712, and FBC scan module 716 can be implemented as a firmware module in the form of codes or instructions that can be executed by a processing unit, such as a microcontroller unit (MCU). Additionally or alternatively, each of L2P module 710, write count module 712, and FBC scan module 716 can be implemented as ASICs, including a digital circuit, an analog circuit, and/or a mixed-signal circuit.

In some implementations, the memory cells (e.g., PCM cells) of non-volatile memory device 704 are divided into memory units (e.g., PCM units). In other words, non-volatile memory device 704 can include a plurality of memory units, each of which can include one or more memory cells. For example, each memory unit may include memory cells coupled to a respective one of the bit lines of non-volatile memory device 704. In other words, memory cells that are coupled to the same bit line (in the same column) are considered a memory unit, according to some implementations. Memory units, as the physical units of memory cells, can correspond to operation units (e.g., pages, codewords, etc.) that are known by memory controller 702. In some implementations, each memory unit corresponds to a page 722 in a codeword 720. It is understood that in some examples, multiple memory units may be grouped into a memory group that corresponds to a codeword 720 including multiple pages 722.

Figure 9:
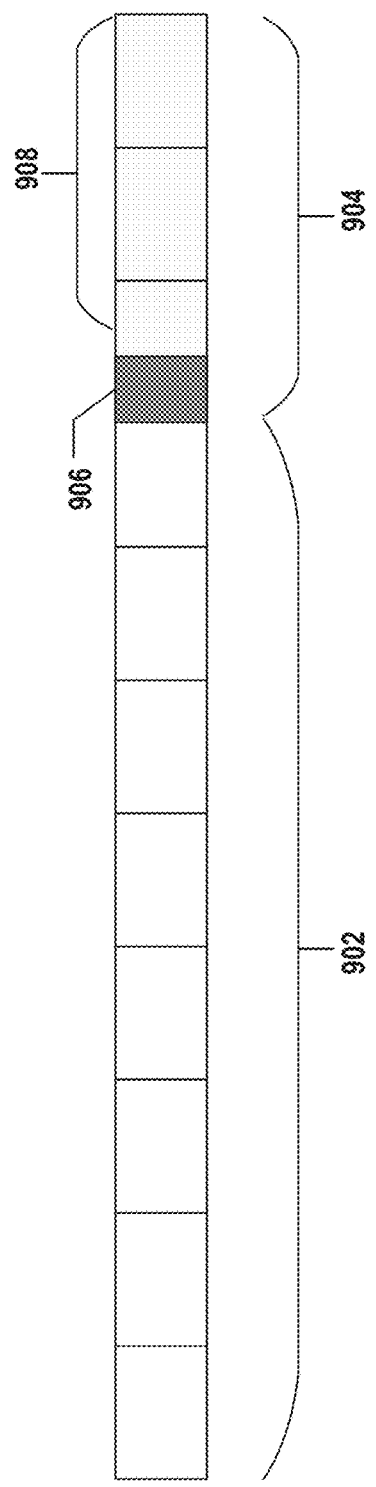
FIG. 9 illustrates a codeword, according to some aspects of the present disclosure.

Referring to FIG. 9, codeword 720 may be the one-shot operation size in memory system 700. In other words, codeword 720 may be the basic unit for performing a write operation in memory system 700. For example, the size of codeword 720 may be 512 bytes, 4,096 bytes, 16,384 bytes, etc. Codeword 720 may be a single error correction code (ECC) codeword or a combination of multiple ECC codewords. In one example, codeword 720 may be a combination of 16 ECC codewords (each having a size of 256 bytes) having a size of 4,096 bytes. As shown in FIG. 9, codeword 720 may include multiple pages of user/host data 902 and multiple pages of spare data 904. In one example, user/host data 902 of each codeword 720 may be from the pages with the same page number (e.g., page 0) of each bank (e.g., bank 0, bank 1, bank 2, and bank 3) and/or die. Each page may correspond to a memory unit in non-volatile memory device 704. Spare data 904 may include parity data 908 for ECC and metadata 906, e.g., write count of codeword 720. For example, each time memory controller 702 controls non-volatile memory device 704 to perform a write operation on codeword 720, the word count of codeword 720 may be increased by 1. The word count of each codeword 720 thus can indicate the word count of the pages herein, as well as the word count of the memory units in non-volatile memory device 704 that correspond to those pages in perspective codeword 720. It is understood that codewords 720 and pages 722 are used as an example of possible logical organizations and hierarchies of memory cells in non-volatile memory device 704 for write disturbance management, and any other examples of logical organizations and hierarchies may be applicable to the write disturbance management schemes disclosed herein as well.

Referring back to FIG. 7, volatile memory device 706 can store a variety of data structures used for managing the write disturbance management schemes disclosed herein, including L2P tables 724 and write counts 730. As described above, the write count of codeword 720 also reflects the write count of each page 722 of codeword 720, as well as the write count of each memory unit corresponding to the respective page 722, according to some implementations. For example, the write count of codeword 720 may be the same as the write count of each page 722 of codeword 720, as well as the write count of each memory unit corresponding to the respective page 722. In some implementations, write counts 730 include write counts of memory units (corresponding to pages 722) or write counts of memory groups (corresponding to codewords 720) based on the write counts of codewords 720, for example, in metadata 906 of codewords 720 stored in non-volatile memory device 704.

Write count module 712 of memory controller 702 can be configured to manage write counts 730, for example, by tracking the number of write operations applied to codeword 720 and storing it as metadata 906 of codeword 720 in non-volatile memory device 704. Write count module 712 can also be configured to load the tracked number from metadata 906 of codeword 720 from non-volatile memory device 704 and store it as write count 730 into volatile memory device 706 when performing write disturbance management. Due to the large number of codewords 720 in non-volatile memory device 704, the size of the write counts for all codewords 720 may be too large to be loaded into volatile memory device 706 at the same time. Thus, in some implementations, only some of the write counts are loaded by write count module 712 into volatile memory device 706 as write counts 730.

In some implementations, L2P tables 724 include a mapping table between the physical address and the logical address for each memory unit. The physical addresses of memory units reflect the physical locations of the memory units and their relative locations as well, such as whether two memory units are physically adjacent to one another, according to some implementations. The logical addresses of memory units, on the other hand, are directly linked to the indices of the pages (e.g., page numbers) that are known by memory controller 702, according to some implementations. For example, as shown in FIG. 10, a mapping table may indicate the mapping relationship between the physical addresses and the logical addresses of 64 memory units. The 64 memory units may be sequentially arranged by their logical addresses from 0 to 63 from the top-left to the bottom-right, and each logical address may be mapped to a respective one of the 64 physical addresses. For example, as shown in the shaded portion of the mapping table, logical address 0 may be mapped to physical address 0, logical address 1 may be mapped to physical address 42, logical address 3 may be mapped to physical address 16, and so on.

L2P module 710 of memory controller 702 can be configured to store L2P tables 724 in non-volatile memory device 704 and maintain and manage L2P tables 724. L2P module 710 can also be configured to load L2P tables 724 from non-volatile memory device 704, and store L2P tables 724 into volatile memory device 706 when performing write disturbance management. L2P module 710 of memory controller 702 can be further configured to convert between the physical address and the logical address of each memory unit based on L2P table 724.

As described above, memory controller 702 controls the operations of non-volatile memory device 704 based on the operation units, such pages 722 and codewords 720, as opposed to physical units of memory cells, such as memory units and memory groups, according to some implementations. L2P module 710 can be further configured to determine the logical address of a memory unit based on the corresponding page, or vice versa. In some implementations, the memory units are divided into a number of sets (M sets), and each set of memory units includes a number of memory units (N memory units) with a corresponding L2P table 724. It is understood that in some examples, the same L2P table 724 may be used for each set of memory units. For example, there may be 64 sets of memory units (M=64), and each set may include 64 memory units (N=64), such that there may be 4,096 memory units (4,096 pages 722) in total. The set index may be from 0 to M−1 (e.g., 63), which may be the same for both the physical and logical addresses of memory units. The unit index may be from 0 to N−1 (e.g., 63), which may be different for the physical and logical addresses of memory units, for example, as shown in FIG. 10.

Figure 11:
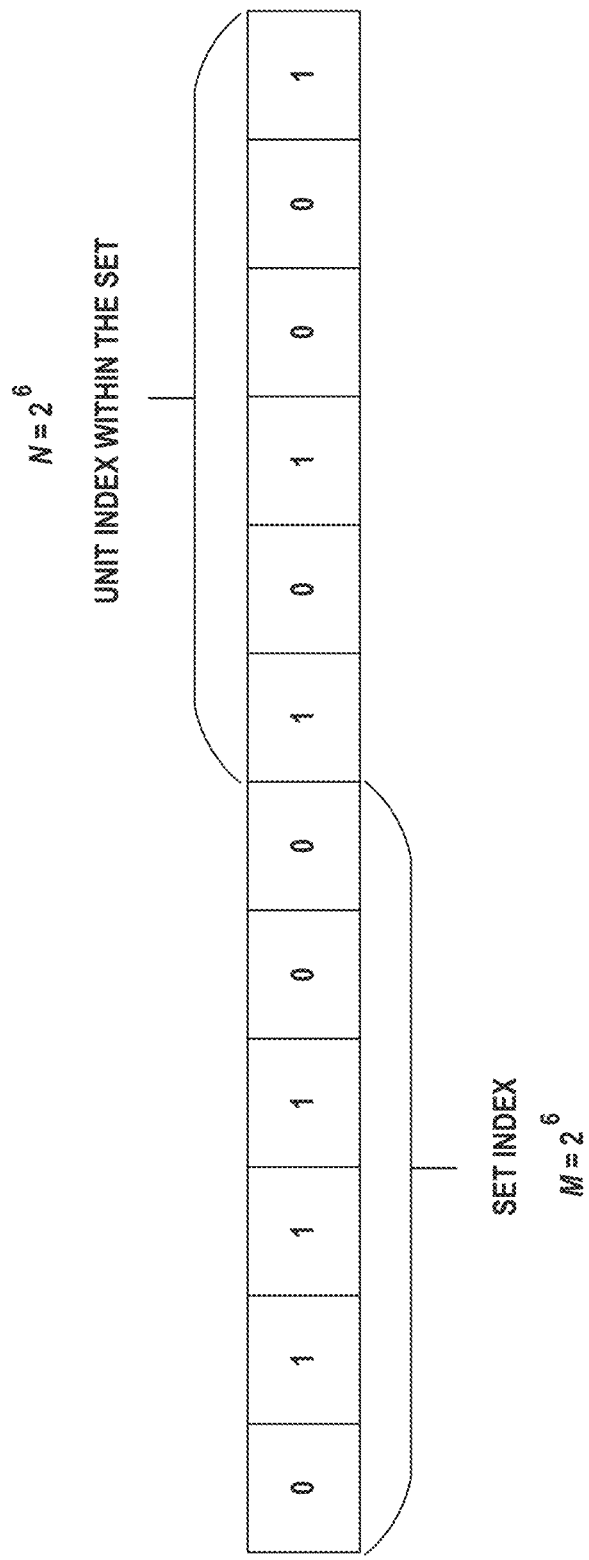
FIG. 11 illustrates a scheme of determining a logical address of a memory unit based on a page, according to some aspects of the present disclosure.

In some implementations, the set index (ID1) and the unit index (ID2) of the logical address of a memory unit are determined by L2P module 710 based on the index of the corresponding page 722 (referred to herein as a page number) using the equations of ID1=INT (page number/N), and ID2=MOD (page number/N), where N is the number of memory units in each set. In other words, the set index and the unit index may be the quotient and remainder, respectively, of the page number divided by the number of memory units in each set. In one example as shown in FIG. 11, binary right shift operation (>>) may be performed on page number for 6 when N=64 ($2^6$). The $\log_2 N$ (6 in this example) bits (101001 in this example) starting from the least significant bit (LSB) may be the unit index of the logical address in the set. Through the AND operation page number with 0x4F in this example. Similarly, in some implementations, the index of a page 722 may be determined by L2P module 710 based on the set index (ID1) and the unit index (ID2) of the logical address of the corresponding memory unit using the revised operation as described above, for example, using the equation of page number=N×ID1+ID2, where N is the number of memory units in each set.

Referring back to FIG. 7, FBC scan module 716 can be configured to determine whether to trigger the write disturbance scanning of neighboring memory units based on the write count of each memory unit of non-volatile memory device 704 and a scanning interval. In some implementations, FBC scan module 716 determines whether the write count of a memory unit reaches one of preset values, for example, determined based on a preset scanning interval (WD_WC_interval). For example, the preset values may be K×WD_WC_interval, where K is a positive integer. In one example when WD_WC_interval=200, FBC scan module 716 may trigger the write disturbance scanning of a memory unit when the word count of the memory unit increases every 200 times (e.g., 200, 400, 600, 800, etc.)

FBC scan module 716 can also be configured to obtain the FBC of each neighboring memory unit that is physically adjacent to the memory unit that triggers the write disturbance scanning, for example, when the write count of the memory units reaches one of the preset values. The FBC may be the number of the bits in a memory unit (e.g., corresponding to a page 722) that flips from the bit value that was written (a.k.a. failed bits), for example, due to the write disturbance. The FBC thus may indicate the level of data corruption and risk of physical damage due to the accumulated write disturbance effect. In some implementations, to obtain the FBC of a neighboring memory unit, FBC scan module 716 is configured to read page 722 corresponding to the neighboring memory unit, and determine the FBC based on the reading and codeword 720 including page 722. As described above with respect to FIG. 9, codeword 720 may include parity data 908 for ECC, which may be used by FBC scan module 716 to be compared with the data read from the neighboring memory unit to determine the FBC of the neighboring memory unit. It is understood that in some examples, parity data 908 in codeword 720 may be used for ECC of all pages of user/host data 902 in codeword 720, and the FBC may be determined for all memory units corresponding to all the pages of user/host data 902 in codeword 720. In other words, two or more neighboring memory units are scanned for FBC, according to some implementations.

FBC scan module 716 can be further configured to determine whether the FBC of one or more neighboring memory units exceeds an FBC threshold. The FBC threshold can be preset based on, for example, the scanning interval and/or the maximum number of FBC that FBC scan module 716 of memory controller 702 can determine (the FBC capability of memory controller 702). For example, the FBC threshold may decrease as the scanning interval increases and/or the FBC capability decreases. By comparing the FBC with the FBC threshold, the need to mitigate the accumulated write disturbance effect on the neighboring memory unit can be evaluated by FBC scan module 716 without recording the write disturbance effect on each memory unit.

FBC scan module 716 can be further configured to refresh the neighboring memory unit when the FBC of the neighboring memory unit exceeds the FBC threshold. In some implementations, FBC scan module 716 is configured to rewrite the neighboring memory unit with the same data stored therein, thereby removing the accumulated write disturbance effect on the neighboring memory unit. For example, FBC scan module 716 may read page 722 corresponding to the neighboring memory unit and write the read data back to the same neighboring memory unit.

Figure 8:
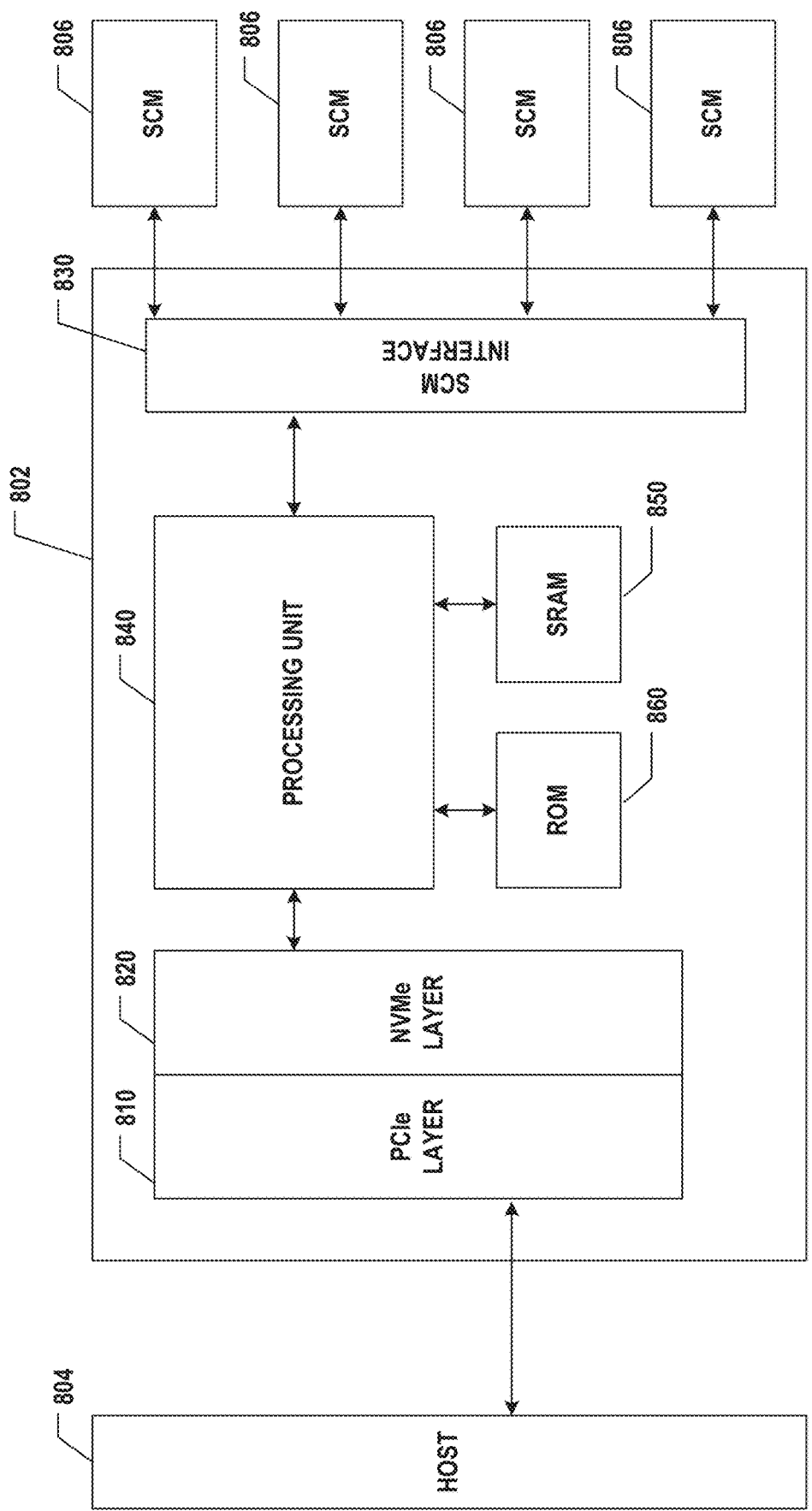
FIG. 8 illustrates a detailed diagram of a memory controller, according to some aspects of the present disclosure.

FIG. 8 illustrates a detailed diagram of a memory controller 802, according to some aspects of the present disclosure. Memory controller 802 may be one example of memory controller 702 in FIG. 7. As shown in FIG. 8, memory controller 802 can include a processing unit 840, an SRAM 850, and a read-only memory (ROM) 860. In some implementations, processing unit 840 includes one or more MCUs. The various firmware modules in memory controller 702 described above with respect to FIG. 7 can be implemented as firmware codes or instructions stored in ROM 860 and executed by processing unit 840. In some implementations, the various data structures in volatile memory device 706 can be stored in SRAM 850. In some implementations, memory controller 802 also includes an SCM interface 830 coupled to SCM devices 806 (e.g., examples of memory devices 104 in FIG. 1) configured to transfer data, command, clock, or any suitable signals between SCM devices 806 and processing unit 840. In some implementations, memory controller 802 further includes various I/O layers to enable various communication protocols facilitating data transfer, communication, and management between a host 804 (e.g., one example of host 108 in FIG. 1) and memory controller 802, including, for example, a PCIe layer 810 and an NVMe layer 820.

Figure 12:
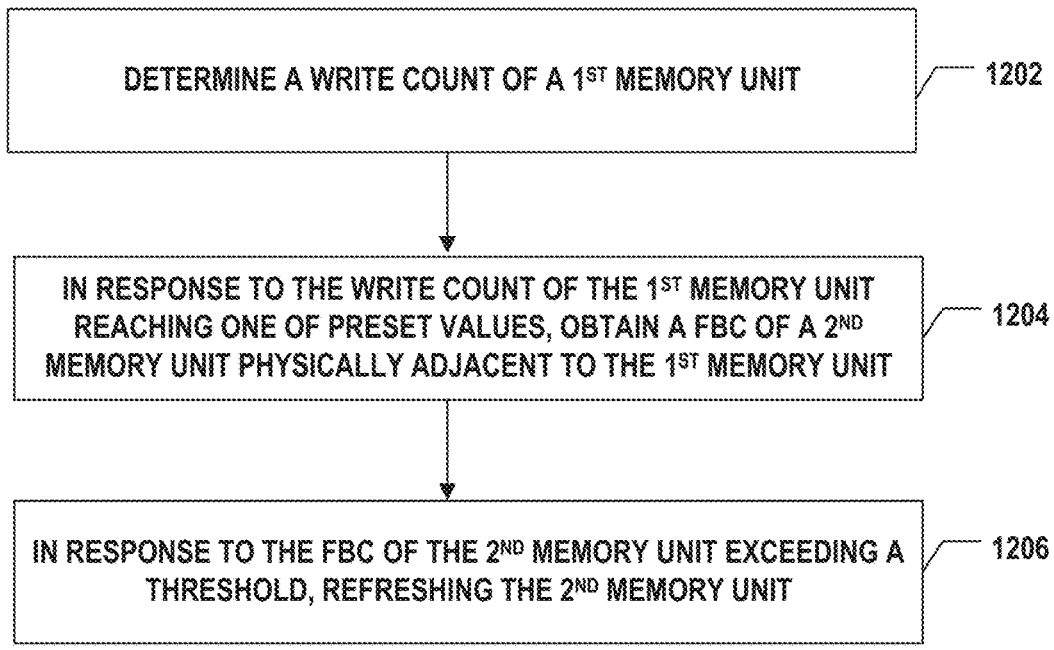
FIG. 12 illustrates a flowchart of a method for operating a non-volatile memory device, according to some aspects of the present disclosure.

FIG. 12 illustrates a flowchart of a method 1200 for operating a non-volatile memory device, according to some aspects of the present disclosure. The non-volatile memory device may be any suitable memory device disclosed herein, such as non-volatile memory device 704. Method 1200 may be implemented by a memory controller, such as memory controller 702, or any other suitable memory controller disclosed herein. It is understood that the operations shown in method 1200 may not be exhaustive and that other operations can be performed as well before, after, or between any of the illustrated operations. Further, some of the operations may be performed simultaneously, or in a different order than shown in FIG. 12.

The non-volatile memory device can include a plurality of memory units. In some implementations, each of the memory units corresponds to a page in a codeword. For example, as shown in FIG. 7, each memory unit may correspond to a page 722 in a codeword 720. In some implementations, each unit includes memory cells coupled to a respective one of the bit lines of the non-volatile memory device. In some implementations, the memory cells include PCM cells.

Figure 13:
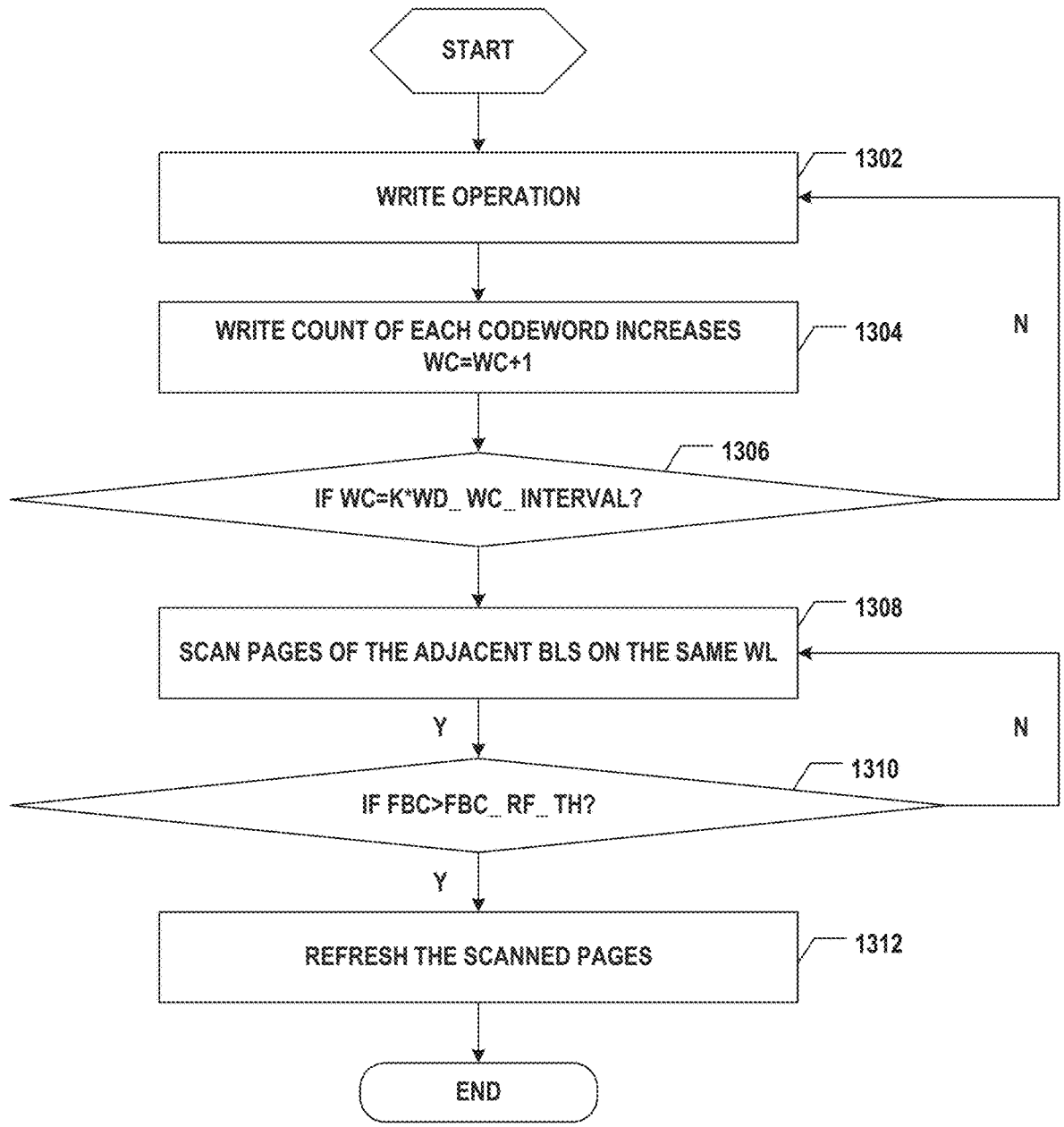
FIG. 13 illustrates a flowchart of a method for performing periodic scanning to manage write disturbance, according to some aspects of the present disclosure.

Referring to FIG. 12, method 1200 starts at operation 1202, in which a write count of a first memory unit of the memory units is determined. In some implementations, to determine the write count, the number of write operations applied to a first codeword is tracked. The first codeword can include a first page corresponding to the first memory unit. For example, as shown in FIG. 7, write count module 712 of memory controller 702 may track the write count of each codeword 720 and use the same write count for memory units corresponding to pages 722 in codeword 720. As shown in FIG. 13, write operations may be performed at 1302 with respect to codewords. At operation 1304, each time a write operation is performed on a codeword, the write count (WC) of the codeword may be increased by 1 (WC=WC+1).

Method 1200 proceeds to operation 1204, as illustrated in FIG. 12, in which, in response to the write count of the first memory unit reaching one of preset values, an FBC of a second memory unit of the memory units that is physically adjacent to the first memory unit is obtained. For example, as shown in FIG. 7, FBC scan module 716 may obtain the FBC of a neighboring memory unit when the write count of a memory unit reaches one of preset values determined based on the scanning interval. In some implementations, to obtain the FBC of the second memory unit, a second page corresponding to the second memory unit is read (scanned), and the number of flipped bits in the second page is determined based on the reading and a second codeword including the second page (e.g., the parity data thereof). In some implementations, the first and second memory units are coupled to the same word line. As shown in FIG. 13, at operation 1306, whether the write count of the codeword reaches to K times of the scanning interval (WD_WC_interval) is determined, where K is a positive integer. If the answer to operation 1306 is yes, at operation 1308, the pages of the adjacent bit lines on the same word lines may be scanned (read) for FBC. Otherwise, the write operations are tracked again at operation 1302.

Figure 14:
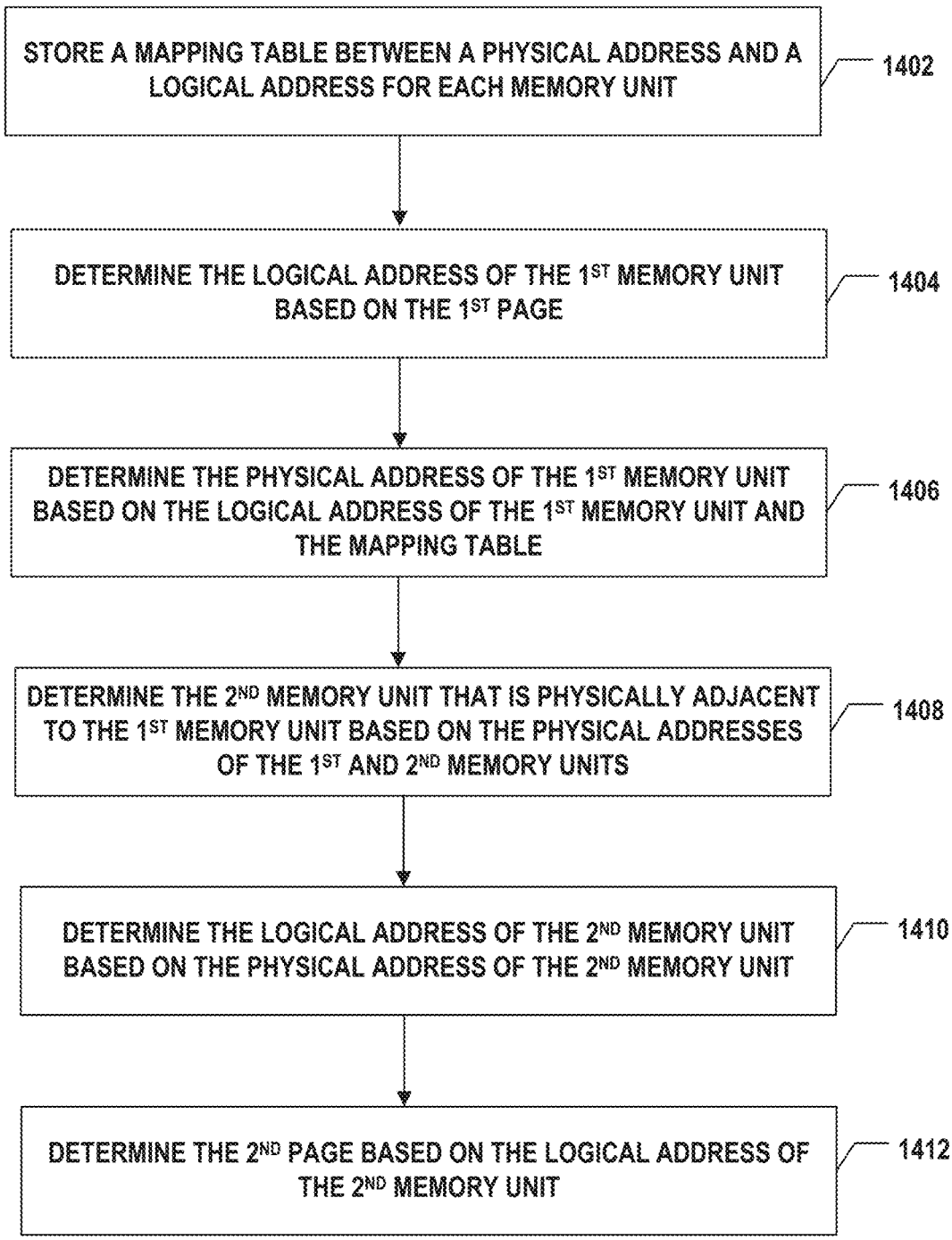
FIG. 14 illustrates a flowchart of a method for converting between pages and physical addresses of memory units, according to some aspects of the present disclosure.

As shown in FIG. 14, to determine the write count of the first memory unit and the FBC of the second memory unit, at operation 1402, a mapping table between a physical address and a logical address for each memory unit is stored. The mapping table may be shown in FIG. 10. At operation 1404, the logical address of the first memory unit is determined based on the first page (e.g., the page number), for example, as shown in FIG. 11. At operation 1406, the physical address of the first memory unit is determined based on the logical address of the first memory unit and the mapping table, for example, as shown in FIG. 10. At operation 1408, the second memory unit that is physically adjacent to the first memory unit is determined based on the physical address of the first memory unit and the physical address of the second memory unit. For example, as shown in FIG. 10, memory units with physical addresses 1 and 3 (underlined) may be the neighboring memory units that are physically adjacent to a memory unit with physical address 2. Accordingly, the neighboring memory units on which the FBC scanning needs to be performed can be identified when a memory unit's scanning intervals are reached.

Since the FBC scanning needs to be performed based on the operations units (e.g., pages) that are visible to a memory controller, the pages corresponding to the neighboring memory can then be identified by a revised operation. At operation 1410, the logical address of the second memory unit is determined based on the physical address of the second memory unit and the mapping table. For example, as shown in FIG. 10, the logical addresses of memory units with physical addresses 1 and 3 (underlined) may be 33 and 49, respectively, according to the mapping table. At operation 1412, the second page (e.g., the page number) is determined based on the logical address of the second memory unit. For example, as shown in FIG. 7, L2P module 710 of memory controller 702 may perform operations 1402 to 1412.

Referring back to FIG. 12, method 1200 proceeds to operation 1206, in which, in response to the FBC of the second memory unit exceeding a threshold, the second memory unit is refreshed. For example, as shown in FIG. 7, FBC scan module 716 may refresh the neighboring memory unit when the FBC of the neighboring memory unit exceeds the FBC threshold. As shown in FIG. 13, at operation 1310, whether the FBC of the scanned pages exceeds the FBC threshold (FBC_RF_TH) is determined. If the answer to operation 1310 is yes, at operation 1312, the scanned pages are refreshed. Otherwise, the pages of the adjacent bit lines are scanned again at operation 1308. In some implementations, to refresh the second memory unit, the second memory unit is rewritten with data stored in the second memory unit.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 702 in FIG. 7. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A method for operating a non-volatile memory device, the non-volatile memory device comprising memory sets each comprising memory units, a physical address of each memory unit comprising a set index and a unit index, and a logical address of each memory unit comprising a set portion corresponding to the set index and a unit portion corresponding to the unit index, the method comprising:
    locating a second memory unit that is physically adjacent to a first memory unit of the memory units in a first memory set by:
    obtaining a first set index and a first unit index of a first physical address of the first memory unit based on a first set portion and a first unit portion of a first logical address of the first memory unit;
    obtaining a second unit index of a second physical address of the second memory unit based on the first unit index;
    obtaining a first mapping table corresponding to the first set index from mapping tables corresponding to the memory sets, wherein the first mapping is between unit indexes and unit portions of memory units in the first memory set of the memory sets;
    retrieving a second unit portion of a second logical address of the second memory unit based on the first mapping table and the second unit index; and
    obtaining the second logical address by combining the first set portion and the second unit portion;
    wherein the first mapping table is a one-dimensional table comprising cells corresponding to the memory units in the first memory set, and sequence numbers of the cells in the mapping table represent unit portions of the memory units in the first memory set, and values stored in the cells are the corresponding unit indexes of the memory units in the first memory set.

2. The method of claim 1, wherein
    the second memory unit is located in response to determining that a write count of the first memory unit reaches one of preset value, and the method further comprises:
    obtaining a flipped bit count (FBC) of the second memory unit; and
    refreshing the second memory unit in response to the FBC of the second memory unit exceeding a threshold.

3. The method of claim 2, wherein each of the memory units comprises memory cells coupled to a respective one of bit lines, and the memory cells comprise phase-change memory (PCM) cells.

4. The method of claim 3, wherein determining the write count of the first memory unit comprises:
    tracking a number of write operations applied to a first codeword, the first codeword comprising a first page corresponding to the first memory unit.

5. The method of claim 1, wherein
    the set index of the physical address of each memory unit is a quotient of the physical address of the memory unit divided by a number of the memory units in each memory set.

6. The method of claim 1, wherein
    the unit index of the physical address of each memory unit is a remainder of the physical address of the memory unit divided by a number of the memory units in each memory set.

7. The method of claim 2, wherein obtaining the second unit index of the second physical address of the second memory unit comprises:
    adding or subtracting 1 from the first unit index of the first physical address of the first memory unit.

8. The method of claim 2, wherein refreshing the second memory unit comprises:
    rewriting the second memory unit with data stored in the second memory unit.

9. The method of claim 1, wherein the first memory unit and the second memory unit are coupled to a same word line.

10. A memory system, comprising:
    a non-volatile memory device comprising a plurality of memory sets each comprising memory units, a physical address of each memory unit comprising a set index and a unit index, and a logical address of each memory unit comprising a set portion corresponding to the set index and a unit portion corresponding to the unit index; and
    a memory controller coupled to the non-volatile memory device and configured to locate a second memory unit that is physically adjacent to a first memory unit of the memory units in a first memory set by:
    obtaining a first set index and a first unit index of a first physical address of the first memory unit based on a first set portion and a first unit portion of a first logical address of the first memory unit;
    obtaining a second unit index of a second physical address of the second memory unit based on the first unit index;
    obtaining a first mapping table corresponding to the first set index from mapping tables corresponding to the memory sets, wherein the first mapping is between unit indexes and unit portions of memory units in the first memory set of the memory sets;
    retrieving a second unit portion of a second logical address of the second memory unit based on the first mapping table and the second unit index; and obtaining the second logical address by combining the first set portion and the second unit portion;
    wherein the first mapping table is a one-dimensional table comprising cells corresponding to the memory units in the first memory set, and sequence numbers of the cells in the mapping table represent unit portions of the memory units in the first memory set, and values stored in the cells are the corresponding unit indexes of the memory units in the first memory set.

11. The memory system of claim 10, wherein the memory controller is configured to locate the second memory unit in response to determining that a write count of the first memory unit reaching one of preset values, and the controller is further configured to:
    obtaining a flipped bit count (FBC) of the second memory unit; and
    refreshing the second memory unit in response to the FBC of the second memory unit exceeding a threshold.

12. The memory system of claim 11, wherein the non-volatile memory device further comprises bit lines, each of the memory units comprises memory cells coupled to a respective one of the bit lines, and the memory cells comprise phase-change memory (PCM) cells.

13. The memory system of claim 11, wherein to determine the write count of the first memory unit, the memory controller is configured to:
    track a number of write operations applied to a first codeword, the first codeword comprising a first page corresponding to the first memory unit.

14. The memory system of claim 10, wherein
the set index of the physical address of each memory unit is a quotient of the physical address of the memory unit divided by a number of the memory units in each memory set.

15. The memory system of claim 10, wherein
the unit index of the physical address of each memory unit is a remainder of the physical address of the memory unit divided by a number of the memory units in each memory set.

16. The memory system of claim 10, to obtain the second unit index of the second physical address of the second memory unit, the memory controller is further configured to:
adding or subtracting 1 from the first unit index of the first physical address of the first memory unit.

17. The memory system of claim 11, wherein to refresh the second memory unit, the memory controller is configured to:
rewrite the second memory unit with data stored in the second memory unit.

18. A non-transitory computer-readable medium, stored in a non-volatile memory device comprising memory sets each comprising memory units, wherein a physical address of each memory unit comprising a set index and a unit index, and a logical address of each memory unit comprising a set portion corresponding to the set index and a unit portion corresponding to the unit index, when executed by a memory controller coupled to the non-volatile memory device, cause the memory controller to perform a method for operating the non-volatile memory device, the method comprising:
locating a second memory unit that is physically adjacent to a first memory unit of the memory units in a first memory set by:
obtaining a first set index and a first unit index of a first physical address of the first memory unit based on a first set portion and a first unit portion of a first logical address of the first memory unit;
obtaining a second unit index of a second physical address of the second memory unit based on the first unit index;
obtaining a first mapping table corresponding to the first set index from mapping tables corresponding to the memory sets, wherein the first mapping is between unit indexes and unit portions of memory units in the first memory set of the memory sets;
retrieving a second unit portion of a second logical address of the second memory unit based on the first mapping table and the second unit index; and
obtaining the second logical address by combining the first set portion and the second unit portion;
wherein the first mapping table is a one-dimensional table comprising cells corresponding to the memory units in the first memory set, and sequence numbers of the cells in the mapping table represent unit portions of the memory units in the first memory set, and values stored in the cells are the corresponding unit indexes of the memory units in the first memory set.

19. The non-transitory computer-readable medium of claim 18, wherein
the second memory unit is located in response to determining that a write count of the first memory unit reaches one of preset value, and the method further comprises:
obtaining a flipped bit count (FBC) of the second memory unit; and
refreshing the second memory unit in response to the FBC of the second memory unit exceeding a threshold.

20. The non-transitory computer-readable medium of claim 19, wherein determining the write count of the first memory unit comprises:
tracking a number of write operations applied to a first codeword, the first codeword comprising a first page corresponding to the first memory unit.

* * * * *